US012566520B2

(12) United States Patent
Cho et al.

(10) Patent No.: US 12,566,520 B2
(45) Date of Patent: Mar. 3, 2026

(54) INSPECTION METHOD OF DISPLAY APPARATUS

(71) Applicant: Samsung Display Co., Ltd., Yongin-si (KR)

(72) Inventors: Hansu Cho, Yongin-si (KR); Junyoung Ko, Yongin-si (KR); Jinwoo Park, Yongin-si (KR); Jeongheon Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/898,405

(22) Filed: Sep. 26, 2024

(65) Prior Publication Data

US 2025/0315127 A1 Oct. 9, 2025

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/0446* (2019.05); *G06F 2203/04112* (2013.01)

(58) Field of Classification Search
CPC .... G06F 3/0418; G06F 3/0412; G06F 3/0446; G06F 2203/04112
See application file for complete search history.

(56) References Cited

U.S. PATENT DOCUMENTS

| | | | |
|---|---|---|---|
| 9,207,273 B2 | 12/2015 | Ko | |
| 2014/0197845 A1* | 7/2014 | Ko | G06F 3/0446 |
| | | | 324/537 |
| 2022/0246880 A1* | 8/2022 | Jeong | H10K 59/8792 |
| 2023/0289012 A1* | 9/2023 | Grygorenko | G06F 3/04166 |

FOREIGN PATENT DOCUMENTS

| | | |
|---|---|---|
| KR | 10-2016-0110020 A | 9/2016 |
| KR | 10-2016-0110021 A | 9/2016 |
| KR | 10-2017-0010674 A | 2/2017 |
| KR | 10-2022-0081402 A | 6/2022 |

* cited by examiner

*Primary Examiner* — Liliana Cerullo
(74) *Attorney, Agent, or Firm* — Womble Bond Dickinson (US) LLP

(57) ABSTRACT

An inspection method of a display apparatus, includes: determining a reference value for sensing electrodes of the display apparatus; measuring a first capacitance corresponding to a mutual capacitance of a first sensing electrode located in a first area from among the sensing electrodes; measuring a second capacitance corresponding to a mutual capacitance of a second sensing electrode located in a second area from among the sensing electrodes; calculating a ratio value of the second capacitance to the first capacitance; and comparing the ratio value with the reference value to determine whether or not the sensing electrodes are defective.

20 Claims, 16 Drawing Sheets

| DIVISION | 400C | 400A | RATIO |
|---|---|---|---|
| AREA RATIO | 100% | 79% | 79% |
| Cm[fF] | 400 | 332 | 83% |

INSPECTION METHOD OF DISPLAY APPARATUS

CROSS-REFERENCE TO RELATED APPLICATION

The present application claims priority to and the benefit of Korean Patent Application No. 10-2024-0045518, filed on Apr. 3, 2024, in the Korean Intellectual Property Office, the entire disclosure of which is incorporated by reference herein.

BACKGROUND

1. Field

Aspects of one or more embodiments of the present disclosure relate to a method of inspecting a display apparatus, and more particularly, to a method of inspecting a touch sensor of a display apparatus including an opening area.

2. Description of the Related Art

Recently, usages of display apparatuses have become more diverse. The thickness of display apparatuses has become thinner and lighter, and the scope of their use has expanded.

As an area occupied by a display area of the display apparatus is expanded, various functions that are incorporated in or linked to the display apparatus have been added. Research on display apparatuses with openings in the display area has continued as a method for expanding the area and adding various functions.

The above information disclosed in this Background section is for enhancement of understanding of the background of the present disclosure, and therefore, it may contain information that does not constitute prior art.

SUMMARY

One or more embodiments of the present disclosure may be directed to a method of inspecting a touch sensor of a display apparatus including an opening area or an opening that is at least partially surrounded by a display area.

However, the present disclosure is not limited to the above aspects and features. Additional aspects and features will be set forth, in part, in the description that follows, and in part, may be apparent from the description, or may be learned by practicing one or more of the presented embodiments of the present disclosure.

According to one or more embodiments of the present disclosure, an inspection method of a display apparatus, includes: determining a reference value for sensing electrodes of the display apparatus; measuring a first capacitance corresponding to a mutual capacitance of a first sensing electrode located in a first area from among the sensing electrodes; measuring a second capacitance corresponding to a mutual capacitance of a second sensing electrode located in a second area from among the sensing electrodes; calculating a ratio value of the second capacitance to the first capacitance; and comparing the ratio value with the reference value to determine whether or not the sensing electrodes are defective.

In an embodiment, the determining of the reference value may be based on a simulation ratio of a mutual capacitance depending on a design area of the first sensing electrode and a design area of the second sensing electrode.

In an embodiment, the determining of the reference value may be further based on a process distribution of the sensing electrodes.

In an embodiment, the display apparatus may include: a substrate including: an opening area; and a display area surrounding the opening area; a plurality of display elements in the display area; and an input sensing layer on the plurality of display elements. The sensing electrodes may be located in the input sensing layer, the first sensing electrode may be located at a central portion of the display area, and the second sensing electrode may be located around the opening area.

In an embodiment, an area of the second sensing electrode may be about 70% to about 85% of an area of the first sensing electrode.

In an embodiment, the display apparatus may further include a thin film encapsulation layer covering the plurality of display elements, and located under the input sensing layer. The thin film encapsulation layer may include a first inorganic encapsulation layer, an organic encapsulation layer, and a second inorganic encapsulation layer. A thickness of the organic encapsulation layer overlapping with the second sensing electrode may decrease toward the opening area.

In an embodiment, the display apparatus may include: a substrate including a display area; a plurality of display elements in the display area; and an input sensing layer on the plurality of display elements. The sensing electrodes may be located in the input sensing layer, a sensing electrode located in the first area from among the sensing electrodes may be located at a central portion of the display area, and a sensing electrode located in the second area from among the sensing electrodes may be located at a corner portion of the display area.

In an embodiment, an area of the second sensing electrode may be about 45% to about 65% of an area of the first sensing electrode.

In an embodiment, the ratio value may have a correlation of 0.9 or more with respect to a ratio value of a touch sensitivity of the second sensing electrode to a touch sensitivity of the first sensing electrode.

In an embodiment, the sensing electrodes may include a plurality of electrode lines in a mesh shape.

According to one or more embodiments of the present disclosure, an inspection method of a display apparatus, includes: determining a reference value for sensing electrodes of the display apparatus including an opening area; measuring a first capacitance corresponding to a mutual capacitance of a first sensing electrode located in a first area from among the sensing electrodes; measuring a second capacitance corresponding to a mutual capacitance of a second sensing electrode located in a second area from among the sensing electrodes; calculating a ratio value of the second capacitance to the first capacitance; and comparing the ratio value with the reference value to determine whether or not the sensing electrodes are defective. A design area of the second sensing electrode is less than a design area of the first sensing electrode.

In an embodiment, the determining of the reference value may be based on a simulation ratio of a mutual capacitance depending on the design area of the first sensing electrode and the design area of the second sensing electrode.

In an embodiment, the determining of the reference value may be further based on a process distribution of the sensing electrodes.

In an embodiment, the reference value may be equal to 65%.

In an embodiment, the display apparatus may include: a substrate including: the opening area; and a display area surrounding the opening area; a plurality of display elements located in the display area; and an input sensing layer on the plurality of display elements. The sensing electrodes may be located in the input sensing layer, the first sensing electrode may be located at a central portion of the display area, and the second sensing electrode may be located around the opening area.

In an embodiment, an area of the second sensing electrode may be about 70% to about 85% of an area of the first sensing electrode.

In an embodiment, the display apparatus may further include a thin film encapsulation layer covering the plurality of display elements, and located under the input sensing layer. The thin film encapsulation layer may include a first inorganic encapsulation layer, an organic encapsulation layer, and a second inorganic encapsulation layer. A thickness of the organic encapsulation layer overlapping with the second sensing electrode may decrease toward the opening area.

In an embodiment, the plurality of display elements may include an organic light emitting diode.

In an embodiment, the ratio value may have a correlation of 0.9 or more with respect to a ratio value of a touch sensitivity of the second sensing electrode to a touch sensitivity of the first sensing electrode.

In an embodiment, the display apparatus may further include a component corresponding to the opening area.

BRIEF DESCRIPTION OF THE DRAWINGS

The above and other aspects and features of the present disclosure will be more clearly understood from the following detailed description of the illustrative, non-limiting embodiments with reference to the accompanying drawings, in which:

FIG. 10 is a cross-sectional view of a display apparatus according to an embodiment;

FIG. 15 shows a mutual capacitance simulation value depending on the location of a sensing electrode.

DETAILED DESCRIPTION

Figure 1:
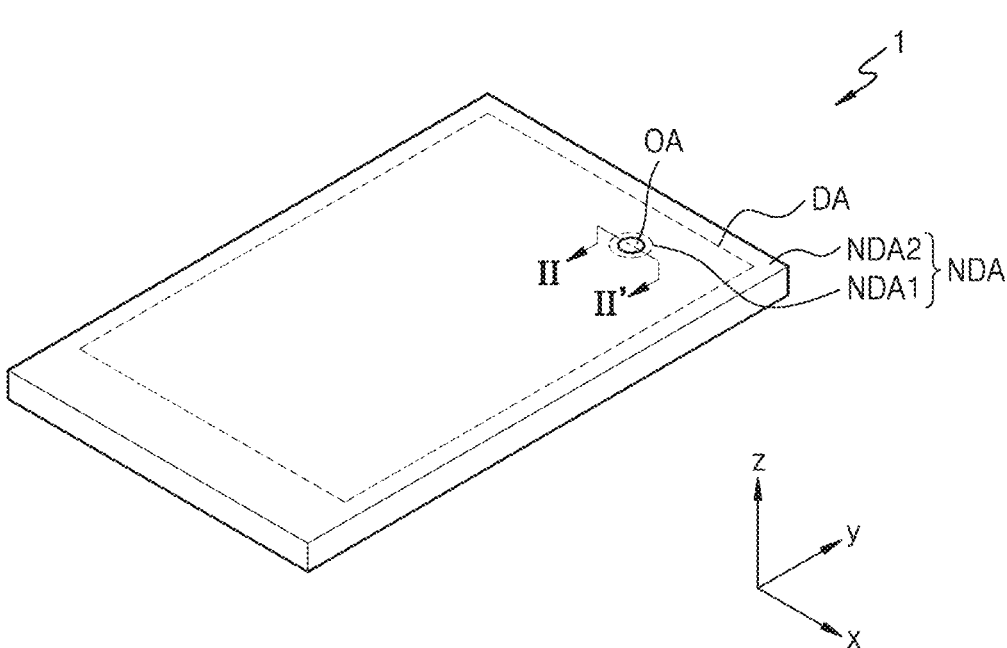
FIG. 1 is a schematic perspective view showing a display apparatus according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a schematic perspective view showing a display apparatus according to an embodiment.

Referring to FIG. 1, the display apparatus 1 includes a display area DA that emits light, and a non-display area NDA that does not emit light. The non-display area NDA is located adjacent to the display area DA. The display apparatus 1 may provide an image (e.g., a certain or predetermined image) by using light emitted from a plurality of pixels arranged in the display area DA.

The display apparatus 1 includes an opening area OA at least partially surrounded (e.g., around a periphery thereof) by the display area DA. According to an embodiment, FIG. 1 shows that the opening area OA is entirely surrounded (e.g., around a periphery thereof) by the display area DA. The non-display area NDA may include a first non-display area NDA1 surrounding (e.g., around a periphery of) the opening area OA, and a second non-display area NDA2 surrounding (e.g., around a periphery of) the display area DA and located outside of the display area DA. In some embodiments, the first non-display area NDA1 may entirely surround (e.g., around a periphery of) the opening area OA, the display area DA may entirely surround (e.g., around a periphery of) the first non-display area NDA1, and the second non-display area NDA2 may entirely surround (e.g., around a periphery of) the display area DA.

Hereinafter, the display apparatus 1 according to an embodiment will be described in more detail in the context of an organic light emitting display apparatus as an example, but the present disclosure is not limited thereto. According to other embodiments, various suitable kinds of display apparatuses, such as an inorganic electro luminescence (EL) display apparatus or a quantum dot light emitting display apparatus, may be applied (e.g., may be used).

Figure 2:
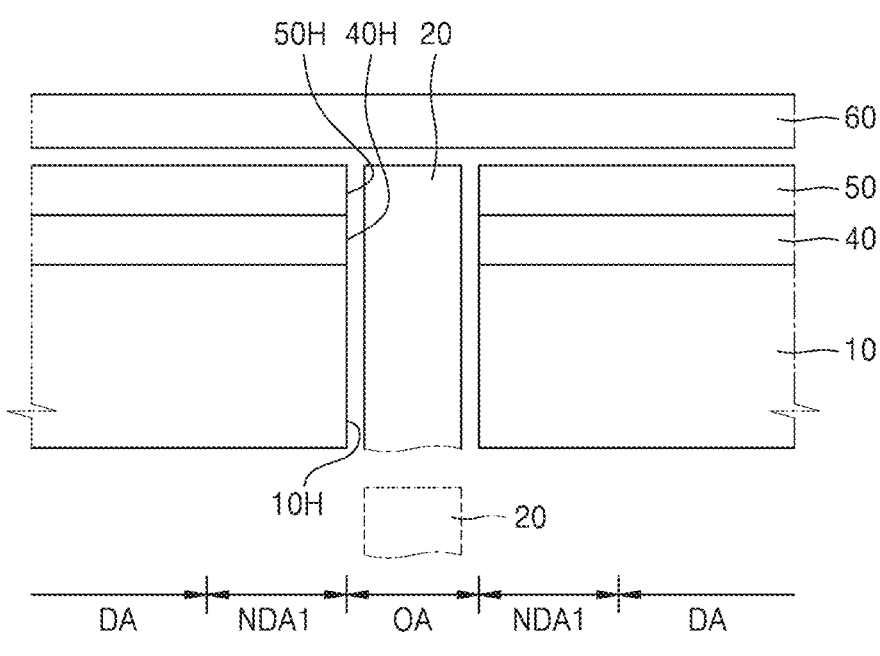
FIG. 2 is a schematic cross-sectional view of a display apparatus according to an embodiment.
Figure 2:
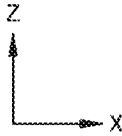

FIG. 2 is a schematic cross-sectional view of a display apparatus according to an embodiment. FIG. 2 may correspond to a cross-section taken along the line II-II' of FIG. 1.

Referring to FIG. 2, the display apparatus 1 may include a display panel 10, an input sensing layer 40 disposed on the display panel 10, and an optical functional layer 50, which may be covered by a window 60. The display apparatus 1 may include various suitable electronic devices, such as a mobile phone, a laptop, or a smart watch.

The display panel 10 may display an image. The display panel 10 includes pixels arranged in the display area DA. The pixels may include a display element, and a pixel circuit connected to the display element. The display element may include an organic light emitting diode, an inorganic light emitting diode, or a quantum dot light emitting diode.

The input sensing layer 40 acquires coordinate information according to an external input, for example, such as a touch event. The input sensing layer 40 may include a sensing electrode (e.g., a touch electrode), and signal lines (e.g., trace lines) connected to the sensing electrode. The input sensing layer 40 may be disposed on the display panel 10.

The input sensing layer 40 may be formed directly on the display panel 10, or may be formed separately from and then bonded to the display panel 10 through an adhesive layer, such as an optical clear adhesive (OCA). For example, the input sensing layer 40 may be formed continuously after a process of forming the display panel 10, and in this case, the adhesive layer may not be located between the input sensing layer 40 and the display panel 10. FIG. 2 shows that the input sensing layer 40 is located between the display panel 10 and the optical functional layer 50, but the present disclosure is not limited thereto, and in another embodiment, the input sensing layer 40 may be disposed on the optical functional layer 50.

The optical functional layer 50 may include an anti-reflective layer. The anti-reflective layer may reduce a reflectivity of light (e.g., external light) incident on the display panel 10 from the outside through the window 60. The anti-reflective layer may include a phase retarder and a polarizer. The phase retarder may be a film type or a liquid crystal coating type, and may include an λ/2 (e.g., half wave plate) phase retarder and/or a λ/4 (e.g., quarter wave plate) phase retarder. The polarizer may also be of a film type or a liquid crystal coating type. The film type polarizer may include a stretched synthetic resin film, and the liquid crystal coating type polarizer may include liquid crystals that are arranged in a suitable arrangement (e.g., a preset or predetermined arrangement). The phase retarder and the polarizer may further include a protective film. The phase retarder and the polarizer itself or the protective film may be defined as a base layer of the anti-reflective layer.

According to another embodiment, the anti-reflective layer may include a black matrix and color filters. The color filters may be arranged in consideration of the color of light emitted from each pixel of the display panel 10. According to another embodiment, the anti-reflective layer may include a destructive interference structure. The destructive interference structure may include a first reflective layer and a second reflective layer that are disposed at (e.g., in or on) different layers from each other. First reflected light and second reflected light that are reflected from the first reflective layer and the second reflective layer, respectively, may interfere destructively with each other, and thus, the reflectivity of the external light may be reduced.

The optical functional layer 50 may include a lens layer. The lens layer may improve a light emission efficiency of the light emitted from the display panel 10 and/or may reduce a color deviation. The lens layer may include a layer having a concave or convex lens shape, and/or may include a plurality of layers having different refractive indices from each other. The optical functional layer 50 may include both the anti-reflective layer and the lens layer described above, or may include any one of the anti-reflective layer or the lens layer.

The display panel 10, the input sensing layer 40, and optical functional layer 50 may include an opening. In this regard, FIG. 2 shows that the display panel 10, the input sensing layer 40, and the optical functional layer 50 include first to third openings 10H, 40H, and 50H, respectively, and the first to third openings 10H, 40H, and 50H overlap with each other. The first to third openings 10H, 40H, and 50H are positioned to correspond to the opening area OA. According to another embodiment, at least one of the display panel 10, the input sensing layer 40, and/or the optical functional layer 50 may not include an opening. For example, one or two components selected from among the display panel 10, the input sensing layer 40, and the optical functional layer 50 may not include an opening. Hereinafter, the opening area OA refers to at least one of the first to third openings 10H, 40H, and 50H of the display panel 10, the input sensing layer 40, and the optical functional layer 50. For example, in the present disclosure, the opening area OA may refer to the first opening 10H or at least the first opening 10H of the display panel 10.

A component 20 may correspond to the opening area OA. The component 20 may be located within the first to third openings 10H, 40H, and 50H as shown in solid lines in FIG. 2, or may be located below the display panel 10 as shown in dotted or dashed lines in FIG. 2.

The component 20 may include an electronic element. For example, the component 20 may include an electronic element that uses light or sound. For example, the electronic element may include a sensor that receives and uses light, such as an infrared sensor, a camera that receives light and captures an image, a sensor that outputs and detects light or sound to measure a distance or recognize a fingerprint, a small lamp that outputs light, or a speaker that outputs sound. In the case of the electronic elements that use light, light of various suitable wavelength bands, such as visible light, infrared light, and/or ultraviolet light, may be used. In some embodiments, the opening area OA may be understood as a transmission area through which light and/or sound output from the component 20 to the outside or traveling from the outside toward the electronic element are transmissive or transmitted.

According to another embodiment, when the display apparatus 1 is used as a smart watch or a vehicle instrument panel, the component 20 may be a member including a clock hand or a needle indicating desired information (e.g., certain or predetermined information, such as vehicle speed for example). When the display apparatus 1 includes a clock hand or a vehicle instrument panel, the component 20 may be exposed to the outside through the window 60, and the window 60 may have an opening corresponding to the opening area OA.

As described above, the component 20 may include the component(s) related to a function of the display panel 10, or may include a component such as an accessory that increases the aesthetics of the display panel 10.

FIG. 2 shows that the window 60 is spaced apart from the optical functional layer 50 by a desired distance (e.g., a preset or predetermined distance), but a layer containing an optically transparent adhesive and the like may be located between the window 60 and the optical functional layer 50.

Figure 3:
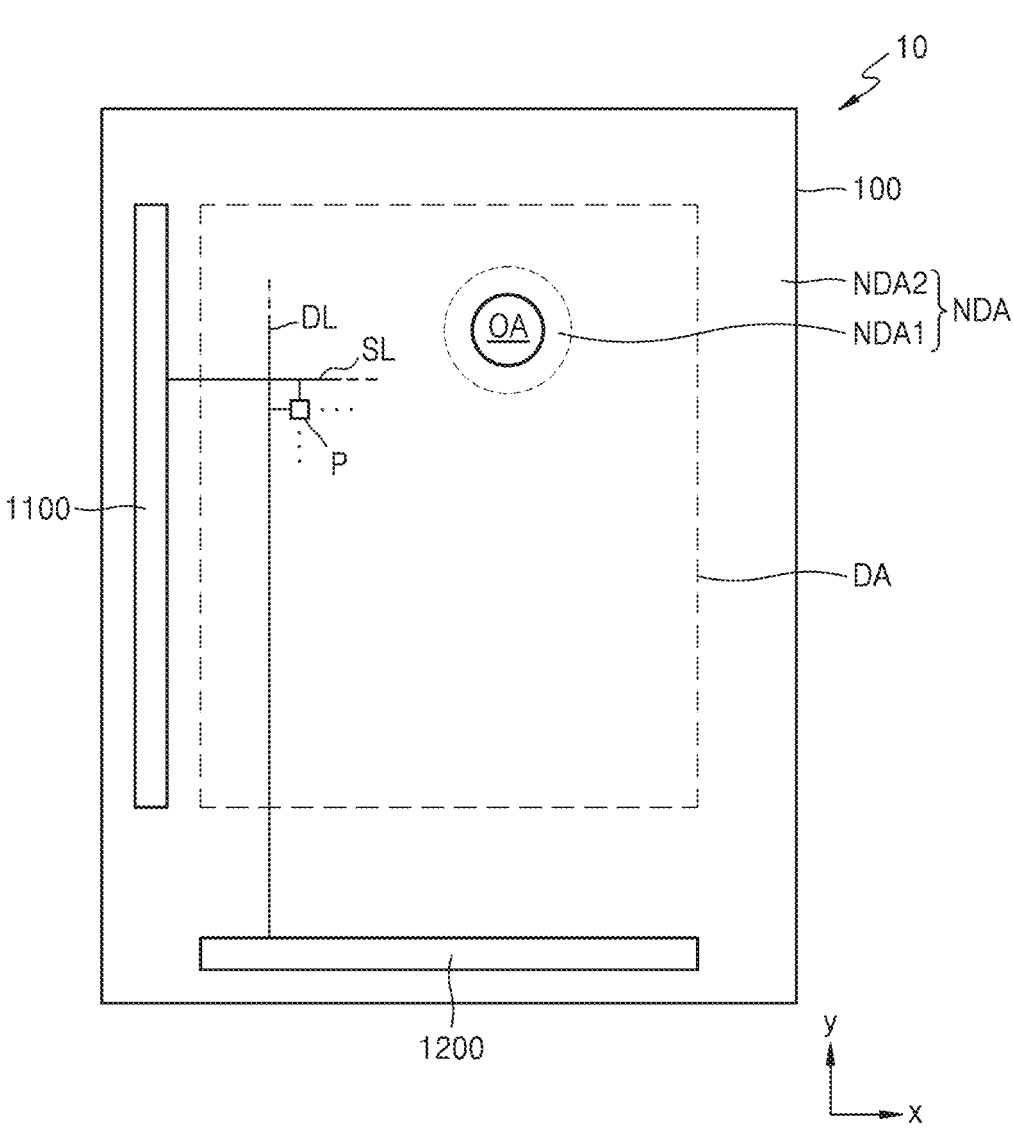
FIG. 3 is a schematic plan view of a display panel according to an embodiment.
Figure 4:
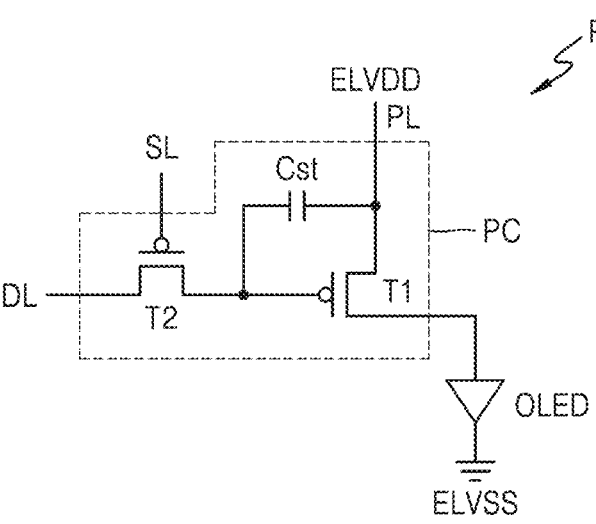
FIG. 4 is a schematic equivalent circuit diagram showing one pixel of a display panel.

FIG. 3 is a schematic plan view of a display panel according to an embodiment. FIG. 4 is a schematic equivalent circuit diagram showing one pixel of a display panel.

Referring to FIG. 3, the display panel 10 includes the display area DA, and the first and second non-display areas NDA1 and NDA2. FIG. 3 may be understood as a view (e.g., a plan view) of a substrate 100 of the display panel 10. For example, the substrate 100 may have an opening area OA, the display area DA, and the first and second non-display areas NDA1 and NDA2. The substrate 100 may include an opening corresponding to the opening area OA, for example, such as an opening formed to pass through upper and lower surfaces of the substrate 100 as will be described in more detail below with reference to FIG. 10.

The display panel 10 includes a plurality of pixels P arranged in the display area DA. As shown in FIG. 4, each pixel P includes a pixel circuit PC, and an organic light emitting diode OLED as a display element connected to the pixel circuit PC. The pixel circuit PC may include a first thin film transistor T1, a second thin film transistor T2, and a storage capacitor Cst. Each pixel P may emit, for example, red, green, blue, or white light through its organic light emitting diode OLED.

The second thin film transistor T2 may be a switching thin film transistor, and may be connected to a scan line SL and a data line DL. The second thin film transistor T2 may transmit a data voltage input from the data line DL to the first thin film transistor T1 according to a switching voltage input from the scan line SL. The storage capacitor CST may be connected to the second thin film transistor T2 and a driving voltage line PL, and may store a voltage corresponding to a difference between a voltage received from the second thin film transistor T2 and a first power voltage ELVDD supplied to the driving voltage line PL.

The first thin film transistor T1 may be a driving thin film transistor, and may be connected to the driving voltage line PL and the storage capacitor Cst. The first thin film transistor T1 may control a driving current flowing in the organic light emitting diode OLED from the driving voltage line PL in response to a voltage value stored in the storage capacitor Cst. The organic light emitting diode OLED may emit light having a desired brightness (e.g., a preset or predetermined brightness) by the driving current. A counter electrode (e.g., a cathode) of the organic light emitting diode OLED may receive a second power voltage ELVSS.

FIG. 4 illustrates that the pixel circuit PC includes two thin film transistors and one storage capacitor, but the present disclosure is not limited thereto. The number of thin film transistors and the number of storage capacitors may variously modified depending on a desired design of the pixel circuit PC.

Referring again to FIG. 3, the first non-display area NDA1 may surround (e.g., around a periphery of) the opening area OA. The first non-display area NDA1 may be an area in which a display element, such as an organic light emitting diode that emits light, is not located. Signal lines for providing a signal to the pixels P provided around the opening area OA may pass through the first non-display area NDA1, or groove(s), which will be described in more detail below, may be located in the first non-display area NDA1. In the second non-display area NDA2, a scan driver 1100 that provides a scan signal to each pixel P, a data driver 1200 that provides a data signal to each pixel P, and a main power wiring for providing first and second power voltages may be arranged. FIG. 4 shows that the data driver 1200 is located adjacent to one lateral side of the substrate 100, but according to another embodiment, the data driver 1200 may be disposed on a flexible printed circuit board (FPCB) that is electrically connected to a pad located at one side of the display panel 10.

Figure 5:
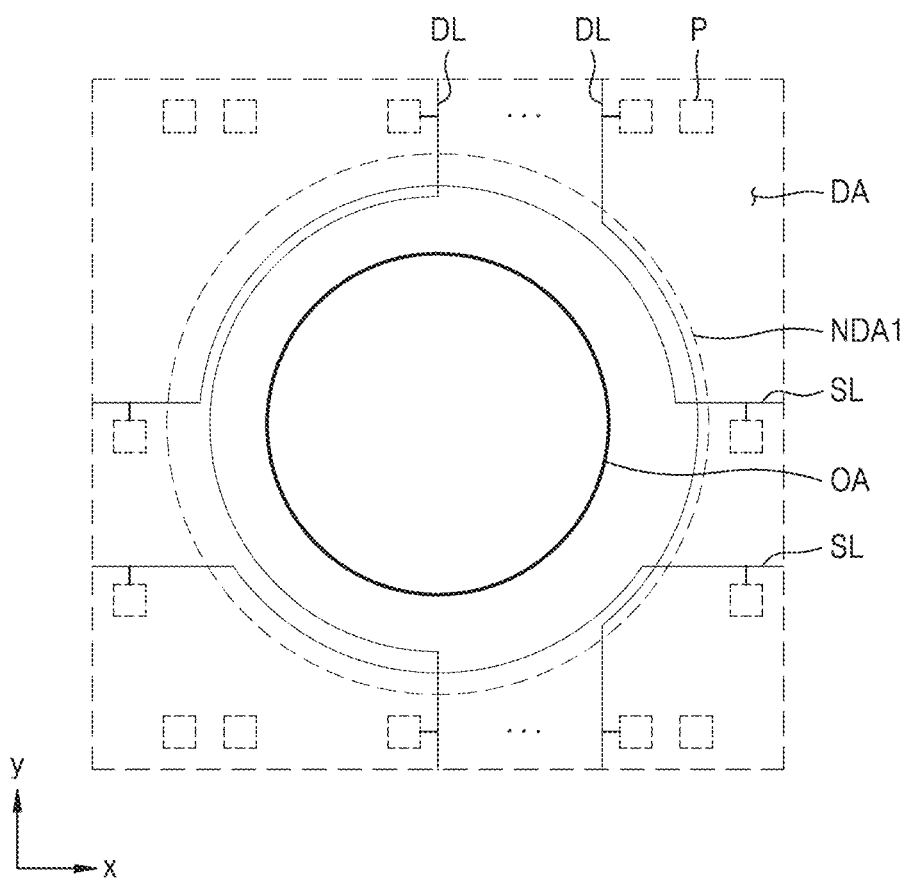
FIG. 5 is a plan view showing a portion of a display panel according to an embodiment.

FIG. 5 is a plan view showing a portion of a display panel according to an embodiment. FIG. 5 shows a wiring, for example, such as signal lines, located in a first non-display area.

Referring to FIG. 5, the pixels P may be arranged in the display area DA around the opening area OA, and the first non-display area NDA1 may be located between the opening area OA and the display area DA.

The pixels P may be arranged to be spaced apart from each other around the opening area OA. The pixels P may be arranged to be spaced apart from above and below the opening area OA, or may be arranged to be spaced apart from left and right sides around the opening area OA.

From among the signal lines that supply signals to the pixels P, the signal lines that are adjacent to the opening area OA may bypass the opening area OA. Some data lines DL from among the data lines passing through the display area DA may extend in the y direction to provide a data signal to the pixels P arranged above and below the opening area OA, and may bypass an edge of the opening area OA in the first non-display area NDA1. Some scan lines SL from among the scan lines passing through the display area DA may extend in the x direction to provide a scan signal to the pixels P arranged on the left and right sides of the opening area OA, and may bypass an edge of the opening area OA in the first non-display area NDA1.

Figure 6:
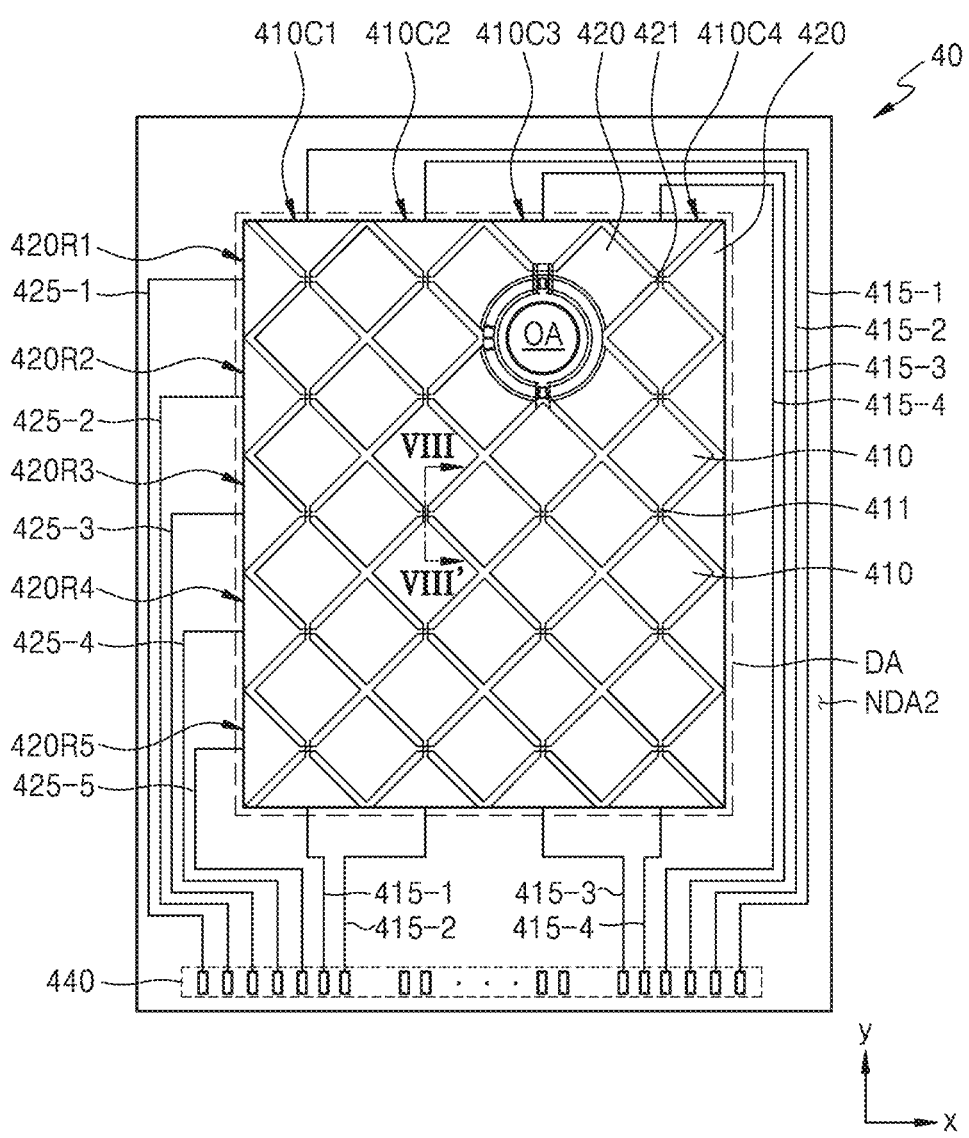
FIG. 6 is a schematic plan view of an input sensing layer on a display panel according to an embodiment.
Figure 7:
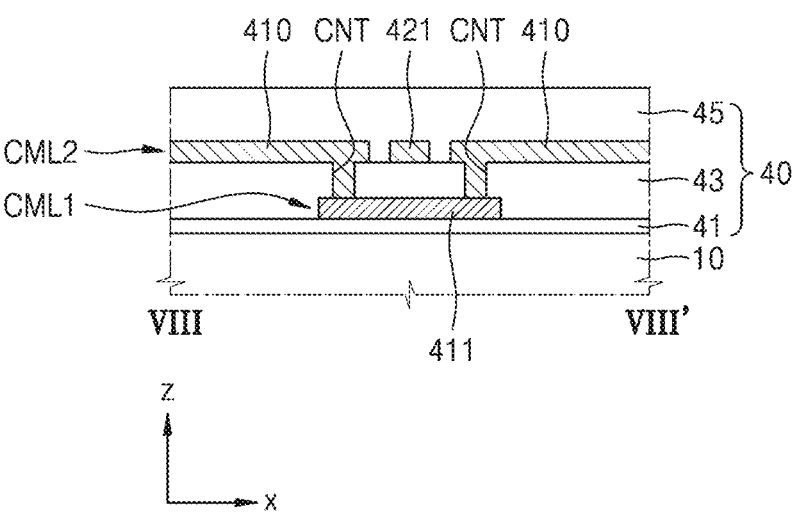
FIG. 7 is a cross-sectional view taken along the line VIII-VIII' of FIG. 6.
Figure 8:
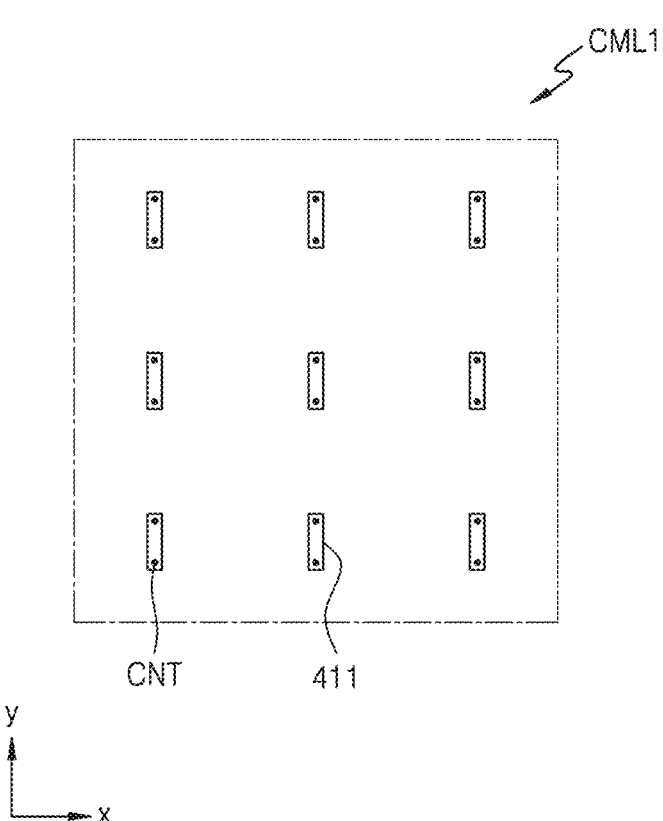
FIG. 8 is a plan view illustrating a first conductive layer of FIG. 7.
Figure 9:
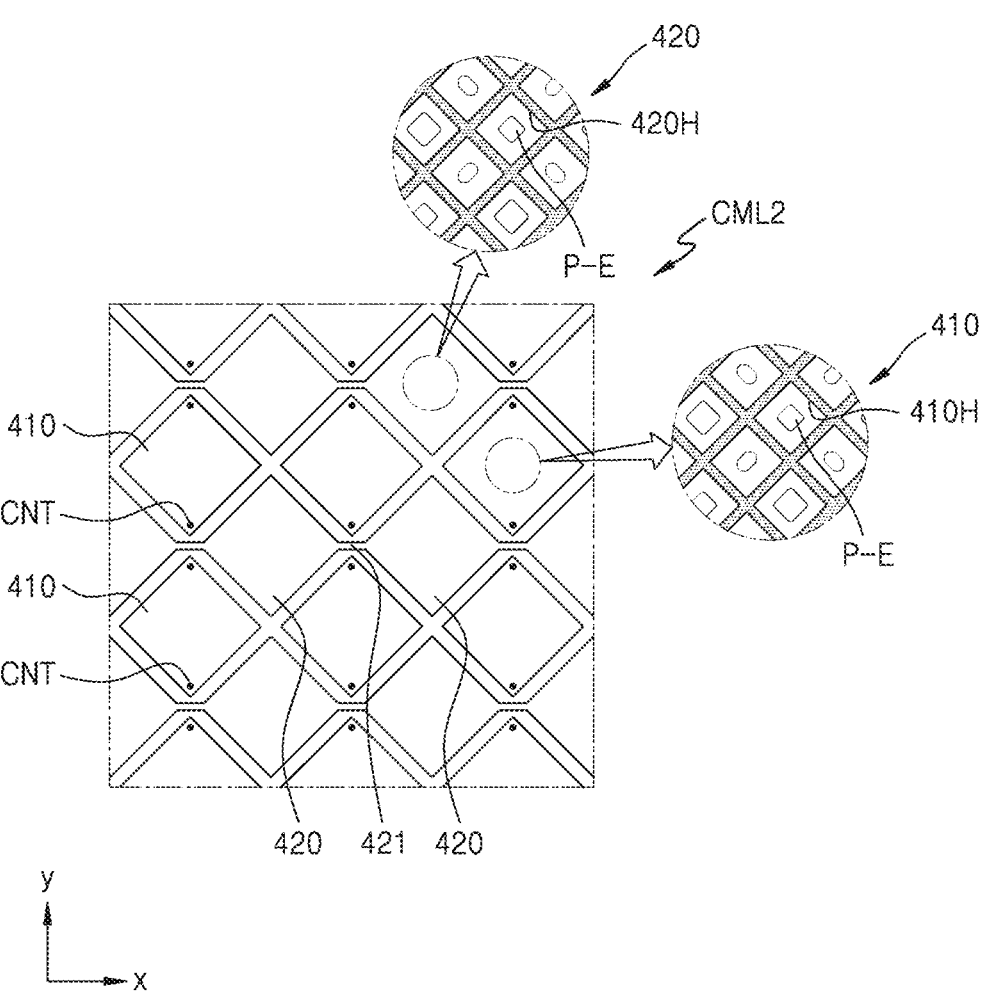
FIG. 9 is a plan view illustrating a second conductive layer of FIG. 7.

FIG. 6 is a schematic plan view of an input sensing layer on a display panel according to an embodiment. FIG. 7 is a cross-sectional view taken along the line VIII-VIII' of FIG. 6. FIG. 8 is a plan view illustrating a first conductive layer of FIG. 7. FIG. 9 is a plan view illustrating a second conductive layer of FIG. 7.

Referring to FIG. 6, the input sensing layer 40 may include vertical sensing electrodes 410, first signal lines 415-1 to 415-4 connected to the vertical sensing electrodes 410, horizontal sensing electrodes 420, and second signal lines 425-1 to 425-5 connected to the horizontal sensing electrodes 420. The input sensing layer 40 may detect an external input by using a mutual capacitance method and/or a self-capacitance method.

The vertical sensing electrodes 410 may be arranged to extend in the y direction, and the horizontal sensing electrodes 420 may be arranged to extend in the x direction that crosses or intersects the y direction. The vertical sensing electrodes 410 arranged to extend in the y direction may be connected to each other by a first connection electrode 411 between neighboring vertical sensing electrodes 410 to form each of first sensing lines 410C1 to 410C4. The horizontal sensing electrodes 420 extending in the x direction may be connected to each other by a second connection electrode 421 between neighboring horizontal sensing electrodes 420 to form each of second sensing lines 420R1 to 420R5. The first sensing lines 410C1 to 410C4 and the second sensing lines 420R1 to 420R5 may cross each other. For example, the first sensing lines 410C1 to 410C4 and the second sensing lines 420R1 to 420R5 may be perpendicular to or substantially perpendicular to each other.

The first sensing lines 410C1 to 410C4 and the second sensing lines 420R1 to 420R5 may be arranged in the display area DA, and may be connected to a sensing signal pad 440 through the first and second signal lines 415-1 to 415-4 and 425-1 to 425-5 formed in the second non-display area NDA2. The first sensing lines 410C1 to 410C4 may be connected to the first signal lines 415-1 to 415-4, respectively. The second sensing lines 420R1 to 420R5 may be connected to the second signal lines 425-1 to 425-5, respectively.

FIG. 6 shows that the first signal lines 415-1 to 415-4 are connected to upper and lower sides of the first sensing lines 410C1 to 410C4, respectively, and through such a structure, a sensing sensitivity may be improved. However, the present disclosure is not limited thereto. According to another embodiment, the first signal lines 415-1 to 415-4 may be connected to the upper sides or the lower sides of the first sensing lines 410C1 to 410C4. The arrangement of the first and second signal lines 415-1 to 415-4 and 425-1 to 425-5 may be variously modified depending on the shape and size of the display area DA, or a sensing method of the input sensing layer 40.

The areas of the vertical and horizontal sensing electrodes 410 and 420 that are disposed adjacent to the opening area OA may be less than those of the other vertical and horizontal sensing electrodes 410 and 420.

The input sensing layer 40 may include a plurality of conductive layers. Referring to FIG. 7, the input sensing layer 40 may include a first conductive layer CML1 and a second conductive layer CML2 that are disposed on the display panel 10. A first insulating layer 41 may be located between the first conductive layer CML1 and the display panel 10. A second insulating layer 43 may be located between the first conductive layer CML1 and the second conductive layer CML2. A third insulating layer 45 may be disposed on the second conductive layer CML2.

According to an embodiment, the first and second insulating layers 41 and 43 may each include an inorganic insulating layer, such as silicon oxide or silicon nitride. The third insulating layer 45 may include an organic insulating layer. FIG. 7 shows that the first insulating layer 41 is located between the display panel 10 and the first conductive layer CML1, but according to another embodiment, the first insulating layer 41 may be omitted, and the first conductive layer CML1 may be located directly above the display panel 10. According to another embodiment, the first and second insulating layers 41 and 43 may each include an organic insulating layer.

The first conductive layer CML1 may include first connection electrodes 411, as shown in FIGS. 6 and 8. The second conductive layer CML2 may include the vertical sensing electrodes 410, the horizontal sensing electrodes 420, and the second connection electrode 421, as shown in FIGS. 6 and 9. The horizontal sensing electrodes 420 may be connected to each other by the second connection electrode 421 formed at (e.g., in or on) the same layer as that of the horizontal sensing electrodes 420. The vertical sensing electrodes 410 may be connected to each other by the first connection electrodes 411 formed at (e.g., in or on) a different layer from that of the vertical sensing electrodes 410. The first connection electrode 411, which electrically connects neighboring vertical sensing electrodes 410 to each other, may be connected to the neighboring vertical sensing electrodes 410 through a contact hole CNT formed in the second insulating layer 43.

The first and second conductive layers CML1 and CML2 may include a metal. For example, the first and second conductive layers CML1 and CML2 may include molybdenum (Mo), aluminum (Al), copper (Cu), and/or titanium (Ti), and may include a multilayered structure or a single layer containing one or more of the above materials. According to an embodiment, the first and second conductive layers CML1 and CML2 may include a multilayered structure of Ti/Al/Ti.

Referring to an enlarged view in FIG. 9, the vertical sensing electrode 410 may have a grid structure (e.g., a lattice structure) including a plurality of holes 410H. The hole 410H may be arranged to overlap with a light emitting area P-E of a pixel. Similarly, the horizontal sensing electrode 420 may have a grid structure (e.g., a lattice structure) including a plurality of holes 420H. The hole 420H may be arranged to overlap with a light emitting area P-E of a pixel.

FIGS. 6 to 9 illustrate that the vertical sensing electrodes 410 and the first connection electrodes 411 are disposed at (e.g., in or on) different layers from each other, but the present disclosure is not limited thereto. According to another embodiment, the vertical sensing electrodes 410 and the first connection electrodes 411 may be disposed at (e.g., in or on) the same layer as each other (e.g., at a second conductive layer), and the horizontal sensing electrodes 420 and the second connection electrodes 421 may be disposed at (e.g., in or on) different layers from each other and connected to each other by a contact hole formed to pass through (e.g., penetrate) the second insulating layer 43.

FIGS. 6 to 9 illustrate that the vertical and horizontal sensing electrodes 410 and 420 are provided in the second conductive layer CML2, but the present disclosure is not limited thereto. According to another embodiment, the vertical sensing electrode 410 and the horizontal sensing electrode 420 may be disposed at (e.g., in or on) different layers from each other. For example, any one of the vertical and/or the horizontal sensing electrodes 410 and 420 may be formed on the first conductive layer CML1, and the other may be formed on the second conductive layer CML2.

Figure 10:
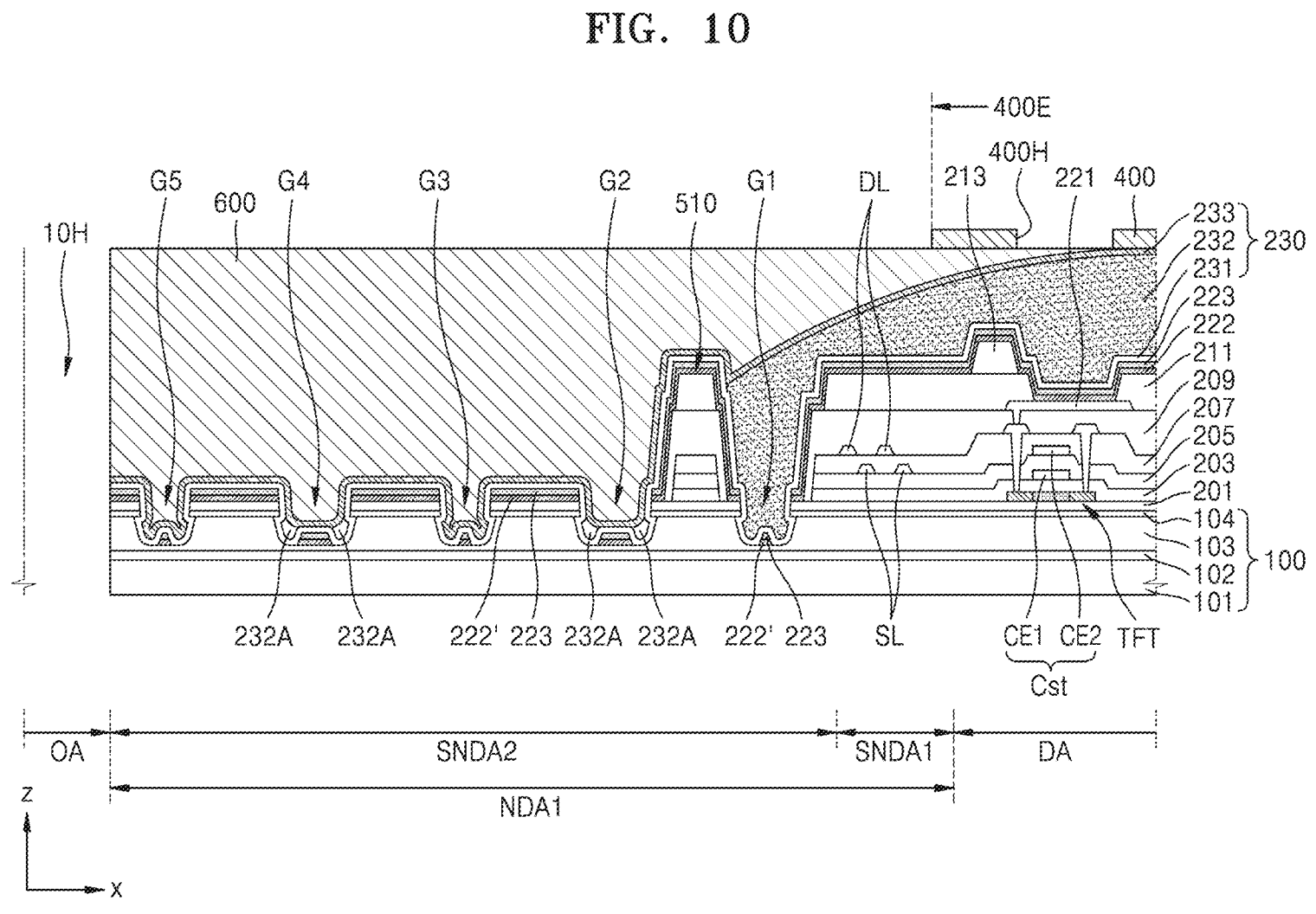

FIG. 10 is a cross-sectional view of a display apparatus according to an embodiment. FIG. 10 shows the components arranged around the opening area OA.

Referring to FIG. 10, the display area DA, the first non-display area NDA1, and the opening area OA is shown. The display area DA will first be described in more detail hereinafter with reference to FIG. 10.

The substrate 100 may include a polymer resin, and may include multiple layers. For example, the substrate 100 may include a base layer containing a polymer resin and an inorganic layer. For example, the substrate 100 may include a first base layer 101, a first inorganic layer 102, a second base layer 103, and a second inorganic layer 104, which are sequentially stacked.

The first and second base layers 101 and 103 may each include a polymer resin. For example, the first and second base layers 101 and 103 may include a polymer resin, such as a polyethersulfone (PES), polyacrylate (PAR), polyetherimide (PEI), polyethylene naphthalate (PEN), polyethyeleneterepthalate (PET), polyphenylene sulfide (PPS), polyallylate, polyimide (PI), polycarbonate (PC), cellulose triacetate (TAC), and/or cellulose acetate propionate (CAP). The polymer resin may be transparent.

The first and second inorganic layers 102 and 104 may each be a barrier layer that prevents or substantially prevents penetration of external foreign substances, and may include a single layer or a multilayered structure containing an inorganic material, such as silicon nitride ($SiN_x$) and/or silicon oxide ($SiO_x$).

A buffer layer 201 to prevent or substantially prevent impurities from penetrating into a semiconductor layer of a thin film transistor may be disposed on the substrate 100. The buffer layer 201 may include an inorganic insulating material, such as silicon nitride or silicon oxide, and may include a single layer or a multilayered structure. In some embodiments, the second inorganic layer 104 of the substrate 100 may be understood as a portion of the buffer layer 201 with a multilayered structure.

A pixel circuit including a thin film transistor TFT and a storage capacitor Cst may be disposed on the buffer layer 201.

The storage capacitor Cst includes a lower electrode CE1 and an upper electrode CE2 that overlap with each other, with a first interlayer insulating layer 205 therebetween. The storage capacitor Cst may overlap with the thin film transistor TFT. In this regard, FIG. 10 shows that a gate electrode of the thin film transistor TFT includes the lower electrode CE1 of the storage capacitor Cst. According to another embodiment, the storage capacitor Cst may not overlap with the thin film transistor TFT. The storage capacitor Cst may be covered with a second interlayer insulating layer 207.

The first and second interlayer insulating layers 205 and 207 may include an inorganic insulating material, such as silicon oxide, silicon nitride, silicon oxy nitride, aluminum oxide, titanium oxide, tantalum oxide, and/or hafnium oxide. The first and second interlayer insulating layers 205 and 207 may include a single layer or a multilayered structure containing one or more of the materials described above.

The pixel circuit including the thin film transistor TFT and the storage capacitor Cst may be covered with an organic insulating layer 209. The organic insulating layer 209 may be a planarization insulating layer. The organic insulating layer 209 may include an organic insulating material, for example, such as a general-purpose polymer such as polymethylmethacrylate (PMMA) or polystyrene (PS), a phenolic group-containing polymer derivative, an acrylic polymer, an imide polymer, an aryl ether polymer, an amide polymer, a fluorine polymer, a p-xylene-based polymer, a vinyl alcohol-based polymer, and/or a suitable blend thereof. According to an embodiment, the organic insulating layer 209 may include polyimide.

A display element, such as an organic light emitting diode, is disposed on the organic insulating layer 209. A pixel electrode 221 of the organic light emitting diode may be disposed on the organic insulating layer 209, and may be connected to the pixel circuit through a contact hole in the organic insulating layer 209.

The pixel electrode 221 may include a conductive oxide, such as indium tin oxide (ITO), indium zinc oxide (IZO), zinc oxide (ZnO), indium oxide (In$_2$O$_3$), indium gallium oxide (IGO), or aluminum zinc oxide (AZO). According to another embodiment, the pixel electrode 221 may include a reflective film including silver (Ag), magnesium (Mg), aluminum (Al), platinum (Pt), palladium (Pd), gold (Au), nickel (Ni), neodymium (Nd), iridium (Ir), chromium (Cr), or a suitable compound thereof. According to another embodiment, the pixel electrode 221 may further include a film including ITO, IZO, ZnO, or In$_2$O$_3$ above/below the reflective film.

A pixel defining film 211 may have an opening exposing an upper surface of the pixel electrode 221 therethrough, and the pixel defining film 211 may cover an edge of the pixel electrode 221. The pixel defining film 211 may include an organic insulating material. As another example, the pixel defining film 211 may include an inorganic insulating material, or may include organic and inorganic insulating materials.

An intermediate layer 222 includes an emission layer. The emission layer may a polymer or a low-molecular organic material that emits light of a desired color (e.g., a preset or predetermined color). According to an embodiment, the intermediate layer 222 may include a first functional layer disposed below (e.g., under) the emission layer, and/or a second functional layer disposed above the emission layer.

The first functional layer may include a single layer or a multilayered structure. For example, when the first functional layer includes a polymer material, the first functional layer may be a single-layer of a hole transport layer (HTL), which includes poly-(3,4)-ethylene-dihydroxy thiophene (PEDOT) or polyaniline (PANI). When the first functional layer includes a low molecular material, the first functional layer may include a hole injection layer (HIL) and a hole transport layer (HTL).

The second functional layer may be selectively provided (e.g., may not always be provided). For example, when the first functional layer and the emission layer include a polymer material, the second functional layer may be formed to improve properties of the organic light emitting diode. The second functional layer may include a single layer or a multilayered structure. The second functional layer may include an electron transport layer (ETL) and/or an electron injection layer (EIL).

Some of the plurality of layers provided in the intermediate layer 222, for example, such as the functional layer(s), may be disposed not only in the display area DA, but also in the first non-display area NDA1, and may be spaced apart (e.g., separated) from each other by first to fifth grooves G1, G2, G3, G4, and G5, which will be described in more detail below, disposed in the first non-display area NDA1.

The counter electrode 223 is located to face (e.g., to be opposite from) the pixel electrode 221, with the intermediate layer 222 located therebetween. The counter electrode 223 may include a conductive material with a low work function. For example, the counter electrode 223 may include a (semi) transparent layer including silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), or a suitable compound thereof. As another example, the counter electrode 223 may further include a layer, such as ITO, IZO, ZnO, or In$_2$O$_3$, on the (semi) transparent layer including one or more of the materials described above.

The display element may be covered by a thin film encapsulation layer 230, and may be protected from external foreign substances and/or moisture. The thin film encapsulation layer 230 may be disposed on the counter electrode 223. The thin film encapsulation layer 230 may include at least one organic encapsulation layer and at least one inorganic encapsulation layer. FIG. 10 shows that the thin film encapsulation layer 230 includes first and second inorganic encapsulation layers 231 and 233, and an organic encapsulation layer 232 located therebetween. According to another embodiment, the number of organic encapsulation layers, the number of inorganic encapsulation layers, and/or the stacking order of the inorganic encapsulation layers may be variously modified as needed or desired.

The first and second inorganic encapsulation layers 231 and 233 may include one or more inorganic insulating materials, such as aluminum oxide, titanium oxide, tantalum oxide, hafnium oxide, zinc oxide, silicon oxide, silicon nitride, and/or silicon oxynitride, and may be formed via a chemical vapor deposition (CVD) method or the like. The organic encapsulation layer 232 may include a polymer-based material. The polymer-based material may include an acrylic resin, an epoxy resin, polyimide, and/or polyethylene.

An input sensing layer may be disposed on the thin film encapsulation layer 230. In this regard, FIG. 10 shows a sensing electrode 400 disposed on the thin film encapsulation layer 230. The sensing electrode 400 may be the vertical sensing electrode 410 or the horizontal sensing electrode 420, as described above with reference to FIG. 9. The sensing electrode 400 includes a hole 400H corresponding to an emissive area of the organic light emitting diode. An end 400E of the sensing electrode 400 on the organic light emitting diode adjacent to the opening area OA may extend into the first non-display area NDA1.

The first non-display area NDA1 will now be described in more detail hereinafter with reference to FIG. 10.

Referring to FIG. 10, the first non-display area NDA1 may include a first sub-non-display area SNDA1 that is relatively more distant from the opening area OA, and a second sub-non-display area SNDA2 that is relatively closer to the opening area OA.

The first sub-non-display area SNDA1 may be an area through which signal lines pass. The data lines DL and scan lines SL of the first sub-non-display area SNDA1 may correspond to the data lines that bypass the opening area OA as described above with reference to FIG. 5. The first sub-non-display area SNDA1 may be a wiring area or a bypass area through which signal lines pass.

The second sub-non-display area SNDA2 is a kind of groove area in which the grooves are arranged, and FIG. 10 shows first to fifth grooves G1, G2, G3, G4, and G5 arranged in the second sub-non-display area SNDA2. The first to fifth grooves G1, G2, G3, G4, and G5 may each have an undercut structure. The first to fifth grooves G1, G2, G3, G4, and G5 may be formed in a multilayered film including an inorganic layer and an organic layer. For example, the first to third grooves G1, G2, and G3 may be formed by removing a portion of the substrate 100 including multiple layers.

The first to fifth grooves G1, G2, G3, G4, and G5 may each be formed by etching the second base layer 103 and the second inorganic layer 104 thereon of the substrate 100. In this regard, FIG. 10 shows that a portion of the second base layer 103 and a portion of the second inorganic layer 104 are removed to form the first to fifth grooves G1, G2, G3, G4, and G5. FIG. 10 shows that portions of the buffer layer 201 on the second inorganic layer 104 are also removed along with the second inorganic layer 104. In FIG. 10, the buffer layer 201 and the second inorganic layer 104 are referred to by different names from each other for convenience of illustration, but either the buffer layer 201 may be understood as one of the multi-layered second inorganic layers 104, or the second inorganic layer 104 may be understood as any one of the multi-layered buffer layers 201.

Each of the first to fifth grooves G1, G2, G3, G4, and G5 may have an undercut structure having a width of a portion passing through the second base layer 103 that is larger than a width a portion passing through an inorganic insulating layer(s), for example, such as the second inorganic layer 104 and/or the buffer layer 201. A portion 222' of the intermediate layer 222 (e.g., the first and second functional layers) and a portion of the counter electrode 223 may be separated through the undercut structure of the first to fifth grooves G1, G2, G3, G4, and G5. In this regard, FIG. 10 shows that the portion 222' of the intermediate layer and the portion of the counter electrode 223 are separated around the first to fifth grooves G1, G2, G3, G4, and G5.

The first inorganic encapsulation layer 231 of the thin film encapsulation layer 230 may cover an inner surface of the first to fifth grooves G1, G2, G3, G4, and G5. The organic encapsulation layer 232 may cover the first groove G1, and may fill the first groove G1 on the first inorganic encapsulation layer 231. The organic encapsulation layer 232 may be formed by applying a monomer on the substrate 100, and then curing the monomer. A barrier rib 510 may be provided between the first and second grooves G1 and G2 to control a flow of the monomer, and to ensure the thickness of the monomer (e.g., the organic encapsulation layer). The barrier rib 510 may include an organic insulating material.

According to an embodiment, during a process of forming the organic encapsulation layer 232, a material of the organic encapsulation layer 232 may be present in some of the grooves. In this regard, FIG. 10 shows an organic material 232A is present in the second and fourth grooves G2 and G4.

The second inorganic encapsulation layer 233 may be disposed on the organic encapsulation layer 232, and may be in direct contact with the first inorganic encapsulation layer 231 on the second to fifth grooves G2, G3, G4, and G5.

A planarization layer 600 may be located in the second sub-non-display area SNDA2 to cover at least one of the grooves. For example, the planarization layer 600 may cover the first to fifth grooves G1, G2, G3, G4, and G5. The planarization layer 600 may cover the second to fifth grooves G2, G3, G4, and G5, and may fill at least one of the second to fifth grooves G2, G3, G4, and G5. As shown in FIG. 10, spaces of the second to fifth grooves G2, G3, G4, and G5, which are above the second inorganic encapsulation layer 233, may be filled with the planarization layer 600.

The planarization layer 600 may cover an area of the second sub-non-display area SNDA2, which is not covered by the organic encapsulation layer 232, thereby increasing a flatness of the display panel around the opening area OA. The planarization layer 600 may include an organic insulating material. The planarization layer 600 may prevent or substantially prevent the components, such as an anti-reflection member or a window, from being poorly connected (e.g., attached or coupled) to, separated from, or lifted from the display panel 10 when the components are disposed on the display panel 10.

The planarization layer 600 may extend over the thin film encapsulation layer 230, and may be spatially separated from the organic encapsulation layer 232 by the second inorganic encapsulation layer 233. For example, similar to the planarization layer 600 being disposed above the second inorganic encapsulation layer 233 and the organic encapsulation layer 232 being disposed below (e.g., under) the second inorganic encapsulation layer 233, the organic encapsulation layer 232 and the planarization layer 600 may be spatially separated from each other. The organic encapsulation layer 232 and the planarization layer 600 may not be in direct contact with each other. The planarization layer 600 may have a thickness of 5 μm or more. In some embodiments, the planarization layer 600 may be omitted as needed or desired.

Figure 11:
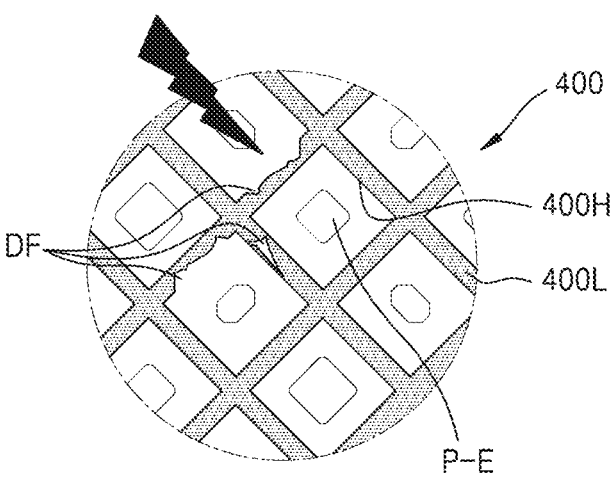
FIG. 11 schematically shows a planar shape of a sensing electrode of a display apparatus according to an embodiment.

FIG. 11 schematically shows a planar shape of a sensing electrode of a display apparatus according to an embodiment.

Referring to FIG. 11, the sensing electrode 400 may include a plurality of electrode lines 400L shaped like a mesh structure. The plurality of electrode lines 400L may be provided to surround (e.g., around a periphery of) the hole 400H corresponding to the light emitting area P-E of the organic light emitting diode.

In a display apparatus having the opening area OA, the thickness of the organic encapsulation layer 232 located around the opening area OA may be reduced toward the opening area OA. Accordingly, there may be a higher probability that a defect occurs in the sensing electrode 400 located around the opening area OA.

For example, defects DF, such as fine holes, grooves, or micro-opens, may be formed in some areas of the electrode lines 400L provided in the sensing electrode 400, or the width of the electrode line 400L may be less than a desired value (e.g., a design value).

Therefore, it may be desirable to be able to more precisely inspect whether or not the sensing electrode 400 located around the opening area OA is defective.

Figure 12:
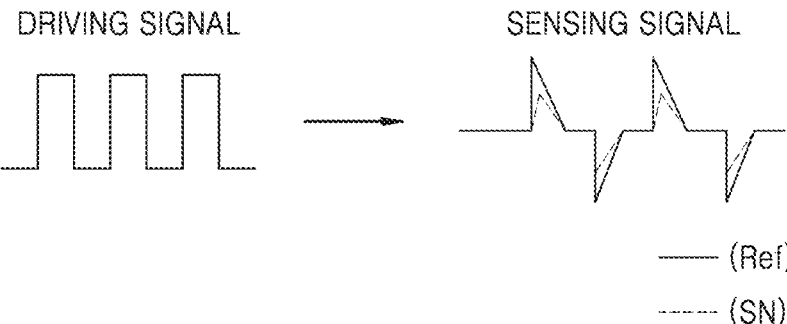
FIG. 12 shows a sensing signal sensed by a horizontal sensing electrode when a driving signal is applied to a vertical sensing electrode in a case in which an input sensing layer is driven using a mutual capacitance method.

FIG. 12 shows a sensing signal sensed by a horizontal sensing electrode when a driving signal is applied to a vertical sensing electrode in a case in which an input sensing layer is driven using a mutual capacitance method. In other words, a mutual capacitance value may be derived from the sensing signal.

Referring to FIG. 12, a sensing signal (Ref) is shown representing when a vertical sensing electrode and a horizontal sensing electrode are formed according to desired values (e.g., design values), and a sensing signal (SN) is shown representing when the defects DF, such as a micro-open, are formed in the vertical sensing electrode and the horizontal sensing electrode, or the width of the electrode line 400L is less than a desired value (e.g., a design value).

As shown in FIG. 12, in the case of the sensing signal (SN), a value of the sensing signal (SN) is less than that of the sensing signal (Ref). In other words, a mutual capacitance value of a defective sensing electrode is lower than that of a normal sensing electrode.

Based on this relationship, a mutual capacitance value may be derived from a value of the sensing signal for each sensing electrode, and the mutual capacitance value may be compared with a reference value to determine whether or not the sensing electrode is defective.

However, when the sensing electrodes have different areas from each other depending on the area, like that in the display apparatus according to some of the embodiments described above, it may be difficult to apply the same reference to all of the sensing electrodes.

In more detail, in the display apparatus according to some embodiments, the area of the sensing electrode located adjacent to the opening area OA may be less than the area of the sensing electrode located in a center area of the display apparatus, and thus, even when the sensing electrodes are formed according to a desired value (e.g., a design value), the mutual capacitance of the sensing electrodes located adjacent to the opening area OA may be less than the mutual capacitance of the sensing electrodes located in the center area.

According to an embodiment, a method for inspecting whether or not a sensing electrode is defective when the area of the sensing electrode located in a display area is formed differently depending on the location may be provided.

Figure 13:
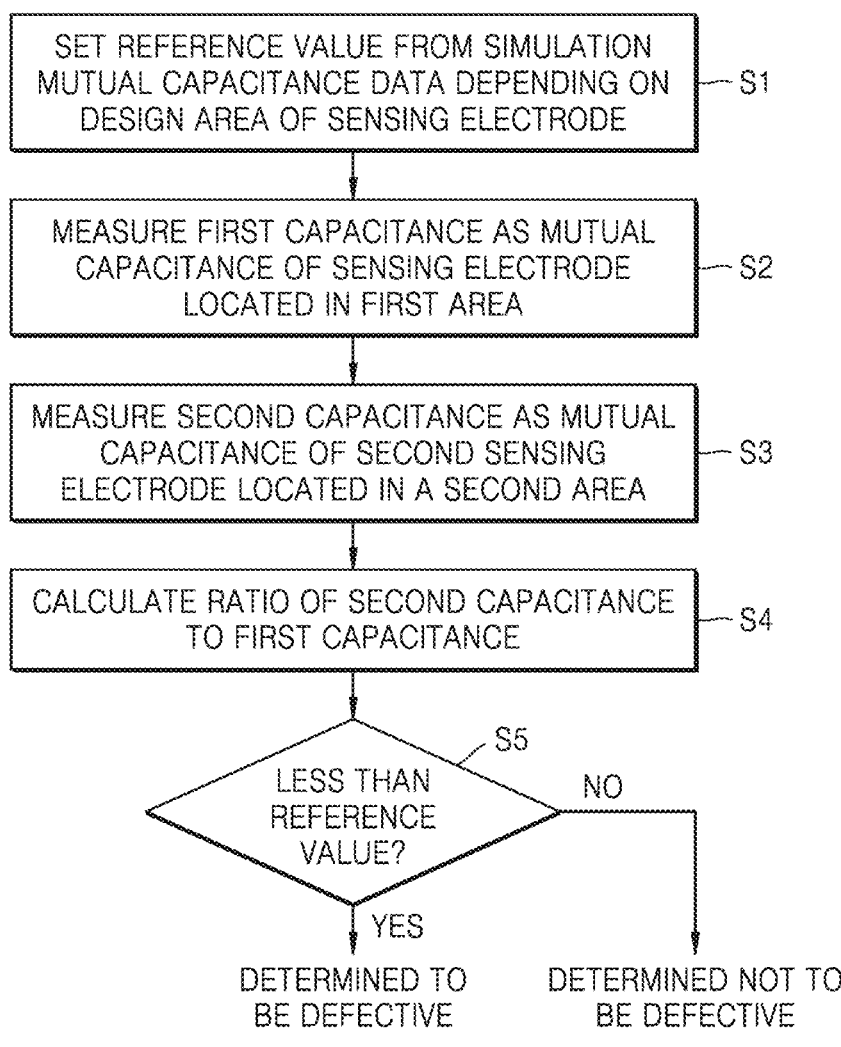
FIG. 13 is a flowchart showing a method of inspecting whether or not a sensing electrode is defective according to an embodiment.
Figure 14:
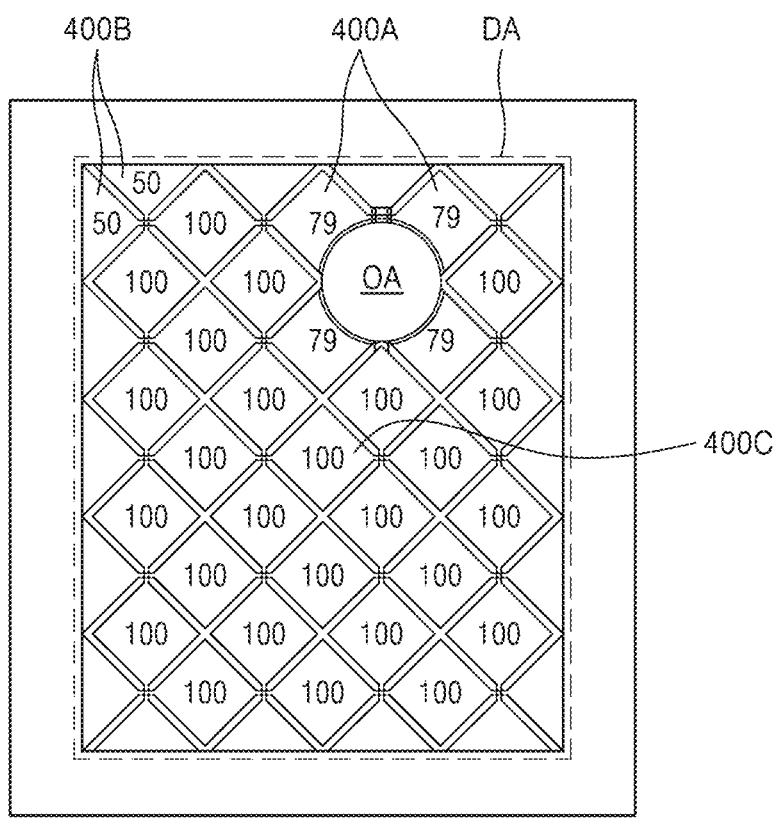
FIG. 14 shows an area ratio for each location of a sensing electrode located in a display area.
Figure 16:
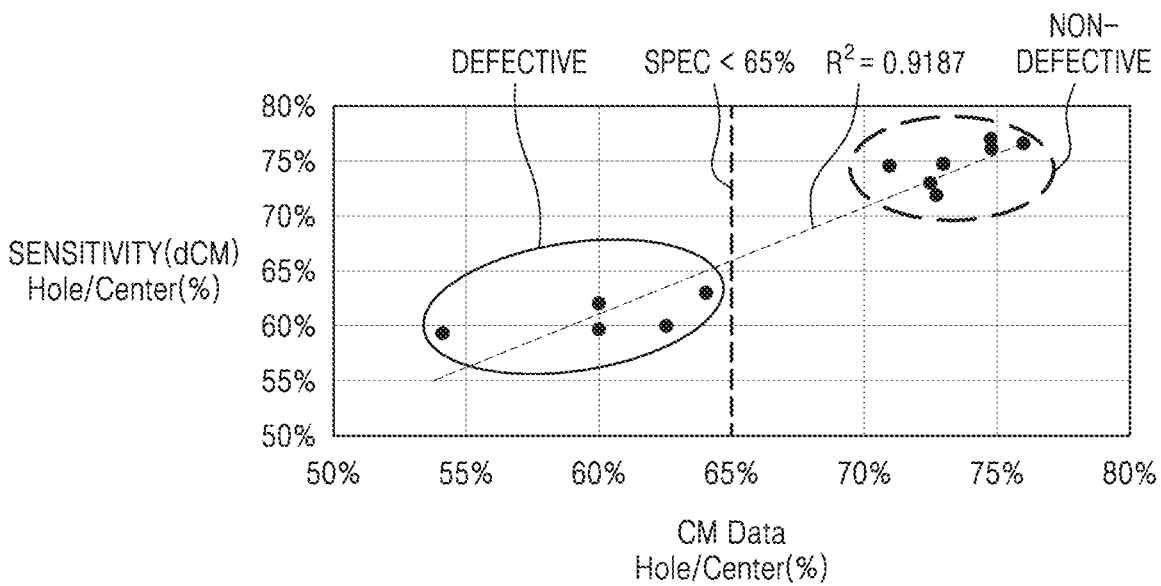
FIG. 16 is a graph of a correlation between the sensitivity of an input sensing layer depending on a mutual capacitance ratio.

FIG. 13 is a flowchart showing a method of inspecting whether or not a sensing electrode is defective according to an embodiment. FIG. 14 shows an area ratio for each location of a sensing electrode located in the display area DA. FIG. 15 shows a mutual capacitance simulation value depending on the location of a sensing electrode. FIG. 16 is a graph of a correlation between the sensitivity of an input sensing layer depending on a mutual capacitance ratio. The sensitivity of the input sensing layer represents a ratio of a difference between a mutual capacitance when touched and a mutual capacitance when not touched at each sensing electrode.

Referring to FIG. 13, a reference value for determining defects may be determined (e.g., may be set) from simulation mutual capacitance data (e.g., a mutual capacitance design value) of a sensing electrode according to the location of the display area (block S1).

Referring to FIG. 14, when the area of a center sensing electrode 400C located at a central portion of the display area DA is 100 (e.g., 100%), the area of an opening sensing electrode 400A located around the opening area OA may be about 70 to about 85 (e.g., about 70% to about 85%). For example, an area ratio of the opening sensing electrode 400A may be 79. An area ratio of a corner detection electrode 400B located at a corner portion of the display area DA may be about 45 to about 65 (e.g., about 45% to about 65%), for example, about 50 (e.g., about 50%).

Referring to FIG. 15, when an area ratio is the same as that described above with reference to FIG. 14, a mutual capacitance simulation value of the center sensing electrode 400C may be derived as 400 fF, and the mutual capacitance simulation value of the opening sensing electrode 400A may be derived as 332 fF. In other words, a mutual capacitance ratio may also decrease depending on the area ratio of the sensing electrode.

A ratio of the mutual capacitance value of the opening sensing electrode 400A to the mutual capacitance value of the center sensing electrode 400C may be derived to be about 83%.

According to an embodiment, a reference value for determining defects may be determined from a ratio of the mutual capacitance value of the opening sensing electrode 400A to the mutual capacitance value of the center sensing electrode 400C. This is because an absolute value of the mutual capacitance may be derived differently depending on the components located below the input sensing layer in each display apparatus, and may also be derived differently depending on a measuring device used for the measurement.

Referring to FIG. 16, depending on the mutual capacitance ratio, a correlation $R^2$ of the touch sensitivity of the input sensing layer may be 0.9187, which may be a very high correlation of 0.9 or more. In other words, the determination of the reference value based on the mutual capacitance ratio of the sensing electrodes may be an appropriate reference value for determining the sensitivity of the input sensing layer. In this case, the touch sensitivity of the input sensing layer may be calculated based on a difference in mutual capacitances when not touched and when touched.

According to an embodiment, a reference value for determining whether or not a sensing electrode is defective may be determined (e.g., may be set) in consideration of a process distribution. For example, when the process distribution is 20%, a reference value SPEC for whether or not the opening sensing electrode 400A is defective may be 65% by applying about 83%×20%. Likewise, a reference value for whether or not the corner detection electrode 400B is defective may be derived.

Referring to FIG. 13, a first capacitance, which is a mutual capacitance of a first sensing electrode located in a first area, may be measured (block S2).

The first area may be a central portion of the display area, and the first sensing electrode may be the center sensing electrode 400C. In other words, a first capacitance, which is the mutual capacitance of the center sensing electrode 400C, may be measured. The first capacitance may be measured from one central sensing electrode 400C located in the central portion of the display area. As another example, the first capacitance may be an average of the measured mutual capacitances of the plurality of center sensing electrodes 400C located in the first area.

Then, a second capacitance, which is a mutual capacitance of a second sensing electrode located in a second area, may be measured (block S3).

The second area may be a peripheral area or a corner area of the opening area. The second area may be an area in which a process is more difficult than that of the first area. When the second area is the peripheral area of the opening area, a second capacitance, which is the mutual capacitance of the opening sensing electrode 400A, may be measured. When the second area is the corner area, a second capacitance, which is the mutual capacitance of the corner detection electrode 400B, may be measured. The second sensing electrodes arranged in the second area may measure the second capacitance for each.

A ratio of the second capacitance to the first capacitance may be calculated (block S4). For example, if the first capacitance is 400 fF and the second capacitance is 332 fF, the ratio may be calculated as second capacitance/first capacitance×100 to be 83%.

Then, the ratio value is compared with the reference value to determine defects (block S5). For example, when the ratio value is less than the reference value (e.g., YES at S5), a product may be determined to be defective. When the ratio value is more than the reference value (e.g., NO at S5), the product may be determined not to be defective.

Referring to FIG. 16, the sensing electrodes measured at less than 65%, which may be the reference value (SPEC) of the ratio (CM DATA) of the mutual capacity, may be determined to be defective, and the sensing electrodes measured at 65% or more may be determined not to be defective.

As described above, according to some embodiments of the present disclosure, whether or not the sensing electrode is defective may be determined based on a ratio of capacitance depending on a reference location, and thus, even if the area of the sensing electrode is designed differently, it may be possible to determine whether or not the sensing electrode is defective without error.

The electronic or electric devices and/or any other relevant devices or components and methods according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An inspection method of a display apparatus, the method comprising:

determining a reference value for sensing electrodes of the display apparatus;

measuring a first capacitance corresponding to a mutual capacitance of a first sensing electrode located in a first area from among the sensing electrodes;

measuring a second capacitance corresponding to a mutual capacitance of a second sensing electrode located in a second area from among the sensing electrodes;

calculating a ratio value of the second capacitance to the first capacitance; and comparing the ratio value with the reference value to determine whether or not the sensing electrodes are defective, wherein the reference value is determined based on a mutual capacitance ratio between the second sensing electrode and the first sensing electrode resulting from a difference in size between the second sensing electrode and the first sensing electrode.

2. The method of claim 1, wherein the determining of the reference value is based on a simulation ratio of a mutual capacitance corresponding to the mutual capacitance ratio depending on a design area corresponding to a size of the first sensing electrode and a design area corresponding to a size of the second sensing electrode.

3. The method of claim 2, wherein the determining of the reference value is further based on a process distribution of the sensing electrodes.

4. The method of claim 1, wherein the display apparatus comprises:

a substrate comprising:

an opening area; and a display area surrounding the opening area;

a plurality of display elements in the display area; and an input sensing layer on the plurality of display elements, wherein the sensing electrodes are located in the input sensing layer, wherein the first sensing electrode is located at a central portion of the display area, and wherein the second sensing electrode is located around the opening area.

5. The method of claim 4, wherein an area of the second sensing electrode is about 70% to about 85% of an area of the first sensing electrode.

6. The method of claim 4, wherein the display apparatus further comprises a thin film encapsulation layer covering the plurality of display elements, and located under the input sensing layer, wherein the thin film encapsulation layer comprises a first inorganic encapsulation layer, an organic encapsulation layer, and a second inorganic encapsulation layer, and wherein a thickness of the organic encapsulation layer overlapping with the second sensing electrode decreases toward the opening area.

7. The method of claim 1, wherein the display apparatus comprises:

a substrate comprising a display area;

a plurality of display elements in the display area; and an input sensing layer on the plurality of display elements, wherein the sensing electrodes are located in the input sensing layer, wherein a sensing electrode located in the first area from among the sensing electrodes is located at a central portion of the display area, and wherein a sensing electrode located in the second area from among the sensing electrodes is located at a corner portion of the display area.

8. The method of claim 7, wherein an area of the second sensing electrode is about 45% to about 65% of an area of the first sensing electrode.

9. The method of claim 1, wherein the sensing electrodes comprise a plurality of electrode lines in a mesh shape.

10. An inspection method of a display apparatus, the method comprising:

determining a reference value for sensing electrodes of the display apparatus;

measuring a first capacitance corresponding to a mutual capacitance of a first sensing electrode located in a first area from among the sensing electrodes;

measuring a second capacitance corresponding to a mutual capacitance of a second sensing electrode located in a second area from among the sensing electrodes;

calculating a ratio value of the second capacitance to the first capacitance; and comparing the ratio value with the reference value to determine whether or not the sensing electrodes are defective, wherein the ratio value has a correlation of 0.9 or more with respect to a ratio value of a touch sensitivity of the second sensing electrode to a touch sensitivity of the first sensing electrode.

11. An inspection method of a display apparatus, the method comprising:

determining a reference value for sensing electrodes of the display apparatus comprising an opening area;

measuring a first capacitance corresponding to a mutual capacitance of a first sensing electrode located in a first area from among the sensing electrodes;

measuring a second capacitance corresponding to a mutual capacitance of a second sensing electrode located in a second area from among the sensing electrodes;

calculating a ratio value of the second capacitance to the first capacitance; and comparing the ratio value with the reference value to determine whether or not the sensing electrodes are defective, wherein a design area of the second sensing electrode is less than a design area of the first sensing electrode, and wherein the ratio value has a correlation with respect to a ratio value of a touch sensitivity of the second sensing electrode to a touch sensitivity of the first sensing electrode.

12. The method of claim 11, wherein the determining of the reference value is based on a simulation ratio of a mutual capacitance depending on the design area of the first sensing electrode and the design area of the second sensing electrode.

13. The method of claim 12, wherein the determining of the reference value is further based on a process distribution of the sensing electrodes.

14. The method of claim 11, wherein the reference value is equal to 65%.

15. The method of claim 11, wherein the display apparatus comprises:

a substrate comprising:

the opening area; and a display area surrounding the opening area;

a plurality of display elements located in the display area; and an input sensing layer on the plurality of display elements, wherein the sensing electrodes are located in the input sensing layer, wherein the first sensing electrode is located at a central portion of the display area, and wherein the second sensing electrode is located around the opening area.

16. The method of claim 15, wherein an area of the second sensing electrode is about 70% to about 85% of an area of the first sensing electrode.

17. The method of claim 15, wherein the display apparatus further comprises a thin film encapsulation layer covering the plurality of display elements, and located under the input sensing layer, wherein the thin film encapsulation layer comprises a first inorganic encapsulation layer, an organic encapsulation layer, and a second inorganic encapsulation layer, and wherein a thickness of the organic encapsulation layer overlapping with the second sensing electrode decreases toward the opening area.

18. The method of claim 17, wherein the plurality of display elements comprise an organic light emitting diode.

19. The method of claim 11, wherein the ratio value has the correlation of 0.9 or more with respect to the ratio value of the touch sensitivity of the second sensing electrode to the touch sensitivity of the first sensing electrode.

20. The method of claim 11, wherein the display apparatus further comprises a component corresponding to the opening area.

* * * * *